Aug. 11, 1953     W. T. GOLLWITZER     2,648,276
MEANS REMOVING CARDS FROM ADDRESS PLATES
Filed May 14, 1951     10 Sheets-Sheet 1

INVENTOR
Walter T. Gollwitzer
BY Wallace and Cannon
ATTORNEYS

Aug. 11, 1953     W. T. GOLLWITZER     2,648,276
MEANS REMOVING CARDS FROM ADDRESS PLATES Filed May 14, 1951     10 Sheets-Sheet 2

Fig. 2

INVENTOR
Walter T. Gollwitzer
By Wallace and Cannon
ATTORNEYS

Aug. 11, 1953 W. T. GOLLWITZER 2,648,276
MEANS REMOVING CARDS FROM ADDRESS PLATES
Filed May 14, 1951 10 Sheets-Sheet 6

INVENTOR
Walter T. Gollwitzer
BY
Wallace and Cannon
ATTORNEYS

Aug. 11, 1953 W. T. GOLLWITZER 2,648,276
MEANS REMOVING CARDS FROM ADDRESS PLATES
Filed May 14, 1951 10 Sheets-Sheet 9

INVENTOR
Walter T. Gollwitzer
By Wallace and Cannon
ATTORNEYS

Aug. 11, 1953  W. T. GOLLWITZER  2,648,276
MEANS REMOVING CARDS FROM ADDRESS PLATES
Filed May 14, 1951  10 Sheets-Sheet 10

INVENTOR
Walter T. Gollwitzer
BY Wallace and Cannon
ATTORNEYS

Patented Aug. 11, 1953

2,648,276

UNITED STATES PATENT OFFICE 2,648,276

MEANS REMOVING CARDS FROM ADDRESS PLATES

Walter T. Gollwitzer, Euclid, Ohio, assignor to Addressograph-Multigraph Corporation, Wilmington, Del., a corporation of Delaware Application May 14, 1951, Serial No. 226,201

11 Claims. (Cl. 101—1)

This invention relates to business machines and particularly to such machines for removing cards such as index or data field cards from individual printing and control devices.

In the production of business documents, and in addressing envelopes or making mailing strips, labels and the like, it is common practice to use individual printing devices that are fed one by one through a printing machine so that impressions may be printed from the printing means of such printing devices. Such printing devices as commonly used embody a carrier or frame which has embossed printing means fixed thereon, and in addition to the foregoing, the frame is usually provided with one or more supplemental areas in which corresponding cards may be removably fixed for different purposes. One such card usually carried on such a printing device frame is the index card upon which various identifying or other data may be printed, and many of these printing devices have one or more additional areas or fields that are utilized for representing numerical or other data or information. These additional fields are in most instances covered by control cards so that perforations may be formed through the frame and through the card for automatic control of the operations of the printing machine or related machines. Such printing machines, such for example as that shown in the co-pending application of Walter T. Gollwitzer and Robert H. Lease, Serial No. 96,288, filed May 31, 1949, are provided with sensing and selecting means that are responsive to the perforations in the control cards to govern the operation of the printing machine. As disclosed in the aforesaid Gollwitzer and Lease application, the data represented on the control cards is related to certain time periods and when these time periods have expired, or when the data relating to such time periods has become out of date, it is necessary to remove the particular cards from the printing device frame so that a new sequence of information recording operations may be applied to the printing devices. Moreover, it often happens that the address of a particular person has such as the address that is printed on the index card of control device may become out of date, and this requires removal of the index card so that it may be replaced with a newly printed and corrected index card.

The aforesaid card removal operations become quite burdensome when a particular user of such printing devices has an extremely large number of such printing devices which must be subjected to card removal operations, and to enable such card removal operations to be performed rapidly and easily and by mechanical means is the primary object of the present invention. Other and related objects of the present invention are to afford card removing means whereby cards in any selected position on the printing devices may be removed, and to enable the selection of the particular card that is to be removed to be readily and easily performed.

Among a large group of printing devices with respect to which card removing operations must be performed, it often happens that there are certain printing devices that relate to persons to whom particular preference must be accorded, and it is customary in such instances to afford a special mark such as a colored card on such printing devices. These special printing devices can, of course, be removed from a group of printing devices before card removing operations are performed on the group, but as a practical matter it is desirable to leave the printing devices in their original sequence. It is, therefore, another and important object of the present invention to provide a card removing machine in which the card removing operation may be skipped with respect to any particular printing device, and to enable this to be done readily and easily and under control of the operator.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

The machine in general

For purposes of disclosure the invention is herein illustrated as embodied in a card ejecting machine 40 having a desk-like frame F affording a table top T. This card ejecting machine 40 is adapted for ejecting cards from printing and control devices D that are shown in detail in Figs. 18, 18A and 18B, and such printing devices are supplied to the machine 40 by stacking such printing devices in an upstanding supply magazine M that is located near the right-hand rear corner of the table top T. The machine 40 is in many of its structural and functional characteristics substantially like the machines shown in Carl J. Hueber Patents Nos. 2,359,850 and 2,359,851, patented October 10, 1944. The printing devices D are withdrawn one by one from the magazine M and are fed along a relatively complex path beneath the table top T so as to be advanced in a step-by-step manner past a transparent inspection window W formed in the table top T, and then to an enclosed card ejecting station E where the cards are ejected from the printing devices D and are deposited through a discharge chute 41 into a collecting basket B that is located on the frame F adjacent the front of the machine. The printing devices D are then fed forwardly and downwardly from the card ejecting station E and into a collecting drawer K.

The printing devices

The printing and control devices D that are to be operated upon by the card removing machine of the present invention may be of many different sizes and types, and the size and other charatceristics of the printing device D serve to determine, in a large measure, the size and operational characteristics of certain elements of the card removing machine of this invention. The card removing machine 40 herein shown is adapted particularly for operation on printing and control devices of the general character disclosed, for example, in Gollwitzer Patent No. 2,132,412, patented October 11, 1938, but in other instances, the machine may be made in such a construction and arrangement as to adapt the same for operation on a different type of printing device, such for example as the printing device shown in Gollwitzer Patent No. 1,992,661, patented February 26, 1935. In all of the various kinds of printing devices of this general class, the printing means of each printing device may be arranged to embody various classes of data to be printed, and such data is disposed in a plurality of lines disposed one above another upon the operative face of the printing device. As shown herein in Fig. 18, it will be evident that the several lines of embossed type are formed upon a printing plate 51 which is carried on one face of a frame 50. The printing device D is, in the present instance, provided with a single printing plate 51, which is removably held in position on the operative face of the printing device D by retaining means formed on the frame 50. The printing plate 51 is held in position by a curled lower edge 52 and lugs 53, and spring latches 55 serve to releasably engage notches in the end edges of the printing plate 51 to hold the same in position on the frame 50. Spaced from the printing plate 51, and adjacent the opposite or upper edge of the frame 50, an index and data carrying card 53 is held in place by a curled edge 56 on the frame 50 and cooperating lugs 57 and 58. A printed impression as at 59 may be formed on index card 53 from a part of the printing means of the printing device so that the printing device may be readily identified.

Figure 18:
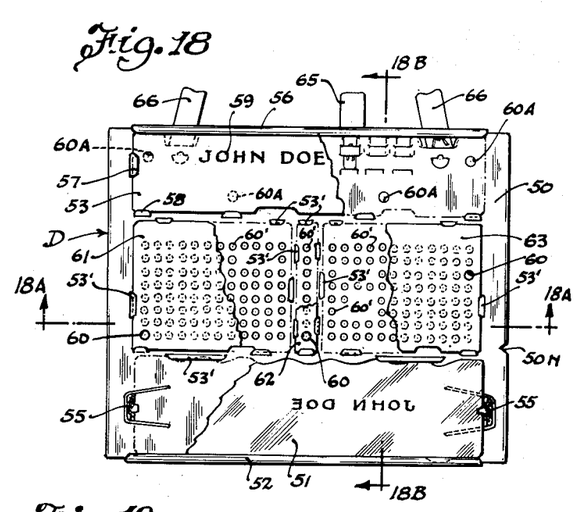
Fig. 18 is a face view of a printing and control device from the frame of which the present machine is adapted to selectively remove the index or control cards.
Figure 18A:
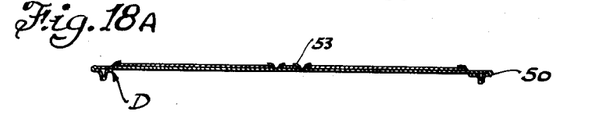
Figs. 18A and 18B are sectional views taken substantially along the lines 18A—18A and 18B—18B of Fig. 18.
Figure 18B:
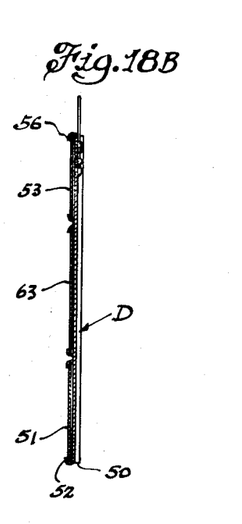
Figure 19:
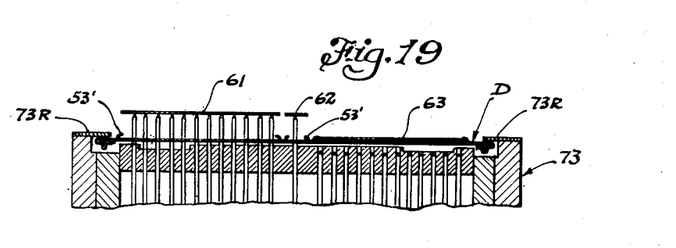
Fig. 19 is a vertical sectional view taken on the card removing station and illustrating the manner in which the cards are displaced from their mounted positions on the printing devices.

The printing and control devices D are each arranged to carry data representations that may be sensed so as to control the functioning of the various mechanisms of the printing machines in which they are adapted to be used, such a machine being shown in the co-pending application of Walter T. Gollwitzer and Robert H. Lease, Serial No. 96,288, filed May 31, 1949. Such data representations in the present instance are afforded by perforations 60 that are formed in any one of several data fields of the control device D in accordance with a predetermined positional code. In the printing and control device D as herein shown, the several data fields are afforded by three separate control cards 61, 62 and 63, the control card 62 being relatively narrow and elongated in a vertical direction while the control cards 61 and 63 are relatively large and are disposed on opposite sides of the control card 62 in the area between the printing plate 51 and the index card 53. The control cards 61, 62 and 63 are held in place by retaining devices 53' that are formed from the metal of the frame 50.

As herein illustrated, the control card 62 is arranged to afford eight index positions at any one or more of which control perforations 60 may be formed. The index points afforded on the control card 62 are arranged in a vertical column, and at each index point, the frame 50 has a frame perforation 60' formed therein.

The control cards 61 and 63 are of generally similar form and each of these cards is arranged to afford three data fields, each of which includes four vertical columns of index positions with eight index positions in each such column. The particular printing device D that is shown herein is intended and particularly adapted for use in connection with mail order sales, and each of the three fields on the card, as 61, is allocated to a particular season of a particular year, and this may be indicated by the printing identifying headings. The several index points within each one of the three fields afforded on the card 61 are allocated to the indication of the same informational values, and as described in the aforesaid Gollwitzer and Lease application, the upper six index points in the left-hand column of the field may allocate to the various months in the season to which such field is allocated. Thus the initial letters of the months from January to July may indicate these six positions. The seventh position in this column, that is, the one that is next to the bottom position, may have the letters printed therein to indicate that this index position is allocated to the representation of a particular class of preference to the customer to which the printing device D pertains. In certain instances, a high order of preference for a particular customer may be indicated by making the card 62, or one of the other cards, from material of a different color.

All of the other index positions in each of the large fields are allocated to different money values so that the amount of an order received from the particular customer in a particular season may be recorded in the proper data field by forming a perforation 60 at the index point allocated to approximately the money value of such purchase. Thus the money values allocated to the several index points in the data field are indicated in the present instance as dollar values, and different index points are allocated to the even dollar values from 1 to 10, and above this amount the dollar values are more widely separated so that relatively high value purchases may be indicated. Thus the letter "C" may be used in association with a figure to indicate increments of hundred-dollar values as required by the use to which the devices are to be put.

In recording purchases in the fields of the printing and control device D, the month of such purchase is recorded by making a control perforation 60 at the index point allocated to such month in the particular season, and the approximate dollar value of the purchase is indicated by making a control perforation 60 at the appropriate value representing index point. When a subsequent purchase is made in a season, the new value is added to the highest previously recorded value, and the sum is indicated by a control perforation at the proper index point.

Such representations as to the months in which purchases have been made and as to the total dollar value of such purchases in any particular season may thus be utilized in the machine shown in the aforesaid Gollwitzer and Lease application to determine whether or not a mailing slip or tag is to be printed from the printing and control device D, and this is accomplished through the use of selector or qualifier mechanism that is disclosed in such application.

Figure 3:
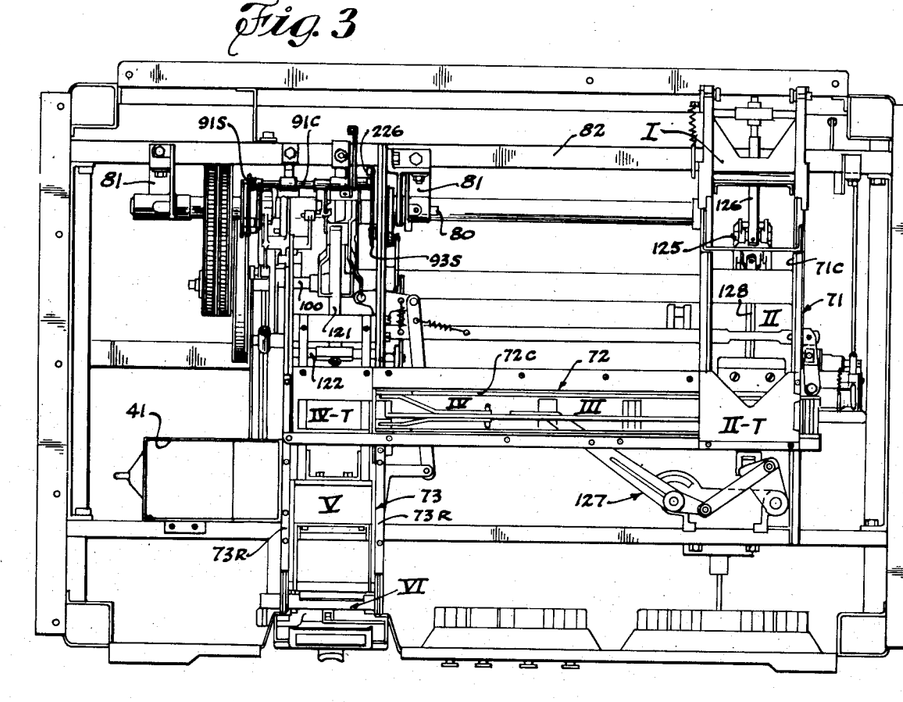
Fig. 3 is a plan view of the machine shown in Fig. 1, the top cover plates being removed to show the path of movement of the printing devices through the machine.

The printing devices D are in many instances classified into a relatively large number of groups or classes and such classification may be attained by suitable identifying means provided at selected identifying positions on the printing device D. In the present instance the printing device D, shown in Fig. 18 has a plurality of identifying tabs 65 disposed at selected positions along its upper edge in the general manner disclosed in the aforesaid Gollwitzer Patent No. 2,132,412, and in this connection it will be noted that a relatively large number of identifying positions are provided along the upper edge of the frame 50 and that the identifying means or tabs 65 in Fig. 18 are disposed in but selected ones of such identifying positions. The printing and control device D as shown in Fig. 3 also has a pair of shift tabs 66 mounted thereon, these tabs in the present instance being located adjacent to the opposite ends of the upper edge of the printing and control device. The shift tabs 66 as herein shown are of the construction illustrated in the Walter T. Gollwitzer Patent No. 2,080,417, patented May 17, 1937, but it will be recognized that other forms of shiftable tab mechanism may be employed.

The data which is to be printed from each printing device is, as aforesaid, disposed upon the operative face of the printing device D in a series of lines, and when a printing device such as that shown in Fig. 18 is employed, the type characters may be formed on the printing plates 51 through the use of an embossing machine such as that shown in the patent to Duncan No. 1,518,904, patented December 9, 1924.

The frame 50 of the printing device D is also provided with a plurality of spaced and symmetrically located openings 60A that are disposed beneath the area in which the index card 53 is mounted, and these openings 60A are utilized in the card ejecting operation as will hereinafter be described.

After the cards 61, 62 or 63 have served their recording function, it is necessary to remove one or more of these cards from all of the printing devices that are used in the particular business system, and with respect to those printing devices that have been removed from the collection, it is desirable to also remove the index card 53, and the present card ejecting machine is utilized to remove one or more of these cards selectively at a rapid rate and in an efficient manner.

*The path of movement of the printing devices*

As hereinbefore pointed out, the card ejecting machine 40 of the present invention is in many of its structural and functional details quite similar to the machines shown in the aforesaid Hueber Patents Nos. 2,359,850 and 2,359,851, but it should be pointed out that in the present machine, the printing means and the supporting platen arm are eliminated, and the card ejecting means of the present invention are provided at the station in the machine which in the aforesaid Hueber patents is employed as a printing station. The particular arrangement of the printing device feeding path as used in the present machine is quite similar to that shown in the aforesaid Hueber Patent No.

2,359,850. The printing device advancing means of the present machine are arranged to advance the printing devices D in a step-by-step manner forwardly from the bottom of the magazine M and then transversely or to the left past the observation window W and then forwardly to the card ejecting station E, after which the printing devices are further advanced in a forward direction and are allowed to drop into collecting drawer K.

As will be evident in Fig. 3 of the drawings, the magazine station is identified as station I and this magazine station I is located along an initial printing device guideway 71 that extends forwardly from the magazine station I through an intermediate or idle station II and into a transfer station II-T. The direction of movement of the printing device is changed in the transfer station II-T so that the printing device is then moved in an endwise direction along an intermediate printing device guideway 72 that includes successive stations III and IV at which the printing device comes to rest in each instance. It might be pointed out that station IV is the station at which the window W is located. At the left-hand end of the intermediate guideway 72, another transfer station IV-T is provided and this transfer station IV-T is located along the intersection of the guideway 72 with a final printing device guideway 73 that extends from the station IV-T forwardly through a card ejecting station V that is located beneath the enclosure that defines the card ejecting station E in Fig. 1 of the drawings. The final printing device guideway 73 extends forwardly from the station V to afford a plate-drop section along which each printing device D drops downwardly into the collecting drawer K. It should be emphasized that the printing devices come to rest for a substantial period of time at each of the aforesaid stations except the transfer station II-T, and the lapse of time during which the printing devices are stationary, particularly at stations IV and V affords the time necessary for visual inspection of the printing devices and for ejection of the cards from such printing devices. In this connection it should be noted that the printing devices are at rest at station IV during the first half of the machine cycle, and are at rest at station V during the last half of the machine cycle.

*The drive means*

The means for advancing the printing and control devices D along the guideways 71, 72 and 73 are described in a general way hereinafter, but it may be pointed out that such advancing means are quite similar to the advancing means shown in the aforesaid Hueber Patent No. 2,359,850 so that reference may be had to such patent for specific details of such advancing means.

Since the basic driving means employed in the card ejecting machine 40 correspond in most respects to the driving mechanism illustrated and described in the aforesaid Hueber Patent No. 2,359,850, such driving means are illustrated herein only insofar as such driving means are different from the disclosure of the aforesaid Hueber patent. Thus, as shown in Figs. 2 to 5 and 13, the machine has a main operating shaft 80 carried in supporting brackets 81 on a horizontal supporting frame bar 82 that is located adjacent to the rear portion of the machine frame. This shaft 80 carries a drive sprocket 83 that is constantly driven through suitable speed reducing means from a drive motor 84, Fig. 2, and when any mechanism of the machine is to be driven, the drive sprocket 83 is operatively connected to the main shaft 80 through a main clutch 91 of the one-revolution type. Thus the sprocket 83 has a sleeve fixed thereto as disclosed in said Hueber patents so as to constitute the driving element of the clutch 91, and the clutch 91 has a driven element 91B that is pinned onto the shaft 80. The clutch 91 is of the one revolution type, and details of this clutch are illustrated in the aforesaid Hueber Patent No. 2,359,850. This clutch 91 is adapted to be disengaged by a stop lever 91S that is normally urged toward an effective position, and is arranged to be moved to its ineffective position by a rocking movement of a control rock shaft 91C, Figs. 4, 5 and 13, upon which the stop lever 91S is fixed.

The printing device feeding mechanism is arranged to be driven from the shaft 80 by a clutch 92 of the general character shown in the aforesaid Hueber patents, but the present instance this clutch 92 is constantly engaged. The driven member of the clutch 92 is connected to an eccentric 97, and associated with the eccentric 97 there is a forwardly extending operating link 99 whereby rocking movement is imparted to a rock shaft 100. This rock shaft 100 is utilized in its rocking movement to impart the desired advancing movements to the printing and control devices D, and for other purposes, as will hereinafter be described.

The main drive shaft 80 also has a control clutch 93 mounted thereon, and this clutch is the one that is utilized in the aforesaid Hueber patents to drive the platen mechanism of the machine therein shown. The clutch 93 includes a driving member pinned on the shaft 80 and a driven member 93B. The engagement of this clutch is adapted to be controlled by a stop lever 93S. The stop lever 93S is normally urged to its ineffective position, and is adapted to be moved to its effective position under control of disabling mechanism 95, Figs. 9 to 12, as will be described hereinafter.

*The printing device advancing means*

As hereinbefore pointed out, the means for advancing the printing and control devices along the guide ways 71, 72 and 73 are driven from the clutch 92 which is in the present instance constantly engaged, and the link 99 extends forwardly and is connected to a lever arm 120 which is fixed on the shaft 100 so as to impart rocking movement to this shaft. The arm 120 has a link 121 extended forwardly from its upper end as shown in Fig. 5 of the drawings, and this link is connected to a cross-bar 122 that extends between a pair of carrier bars 73C that are reciprocably mounted in the guideway 73 as described in the aforesaid Hueber patents.

Similar reciprocable carrier bars 71C are mounted in the initial guideway 71 and these carrier bars are operated by an arm 125 fixed on the shaft 100 and a link 126 that extends from the arm 125 to the carrier bars 71C as shown in detail in the aforesaid Hueber patents. The intermediate guideway 72 is also provided with reciprocable carrier bars 72C and these carrier bars 72C are reciprocated in timed relation to the carrier bars 71C and 73C by a linkage mechanism 127 that is operatively connected to the arm 125 by means including a link 128 which is also described in detail in the aforesaid Hueber patents. The actuation and timing of the three sets of carrier bars is such that the carrier bars 71C and 73C move from front to rear at the same time and in the same direction in each instance, while the carrier bars 72C move to the left while the carrier bars 71C and 73C are moving forwardly and move in a left-hand direction as viewed in Fig. 3 when the carrier bars 71C and 73C are moving in their rearward or retracting directions. The operation of these carrier bars is such that the printing devices come to rest at station II for substantially one-half of the machine cycle while the printing devices come to rest for but a short period at station II-T. The printing devices then move to the left along the intermediate guideway 72, coming to rest successively at stations III, IV, and IV-T, after which the printing devices move forwardly into the ejecting station V and are then advanced forwardly and downwardly so as to deposit the same in the collecting drawer K. As the printing devices are advanced in their upwardly facing position along said guideways, the printing devices are held down by overhanging guide or retaining strips, as shown in the aforesaid Hueber patents, and such strips in the guideway 73 are herein identified as retaining or hold-down strips 73R.

*The ejecting mechanism*

Figure 4:
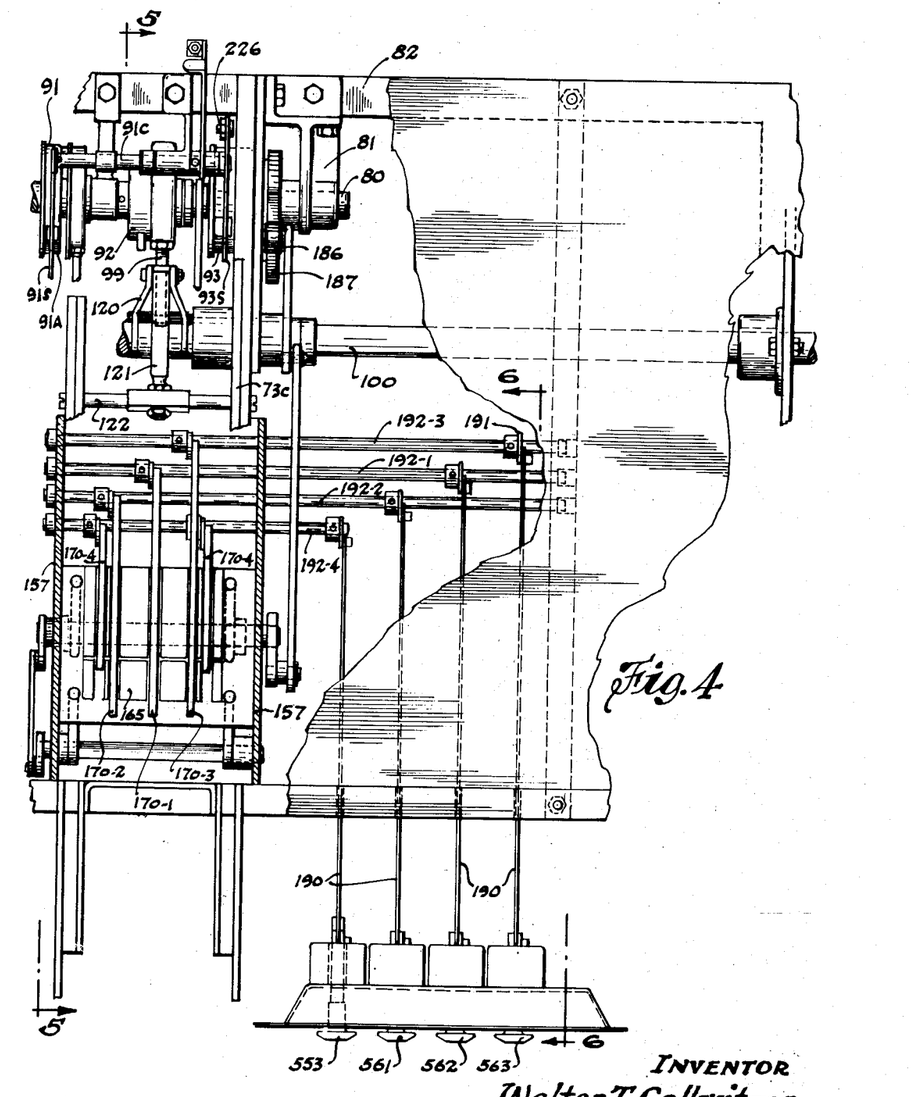
Fig. 4 is a plan sectional view taken through a portion of the machine so as to show details of actuation and control of the card removing mechanism.
Figure 5:
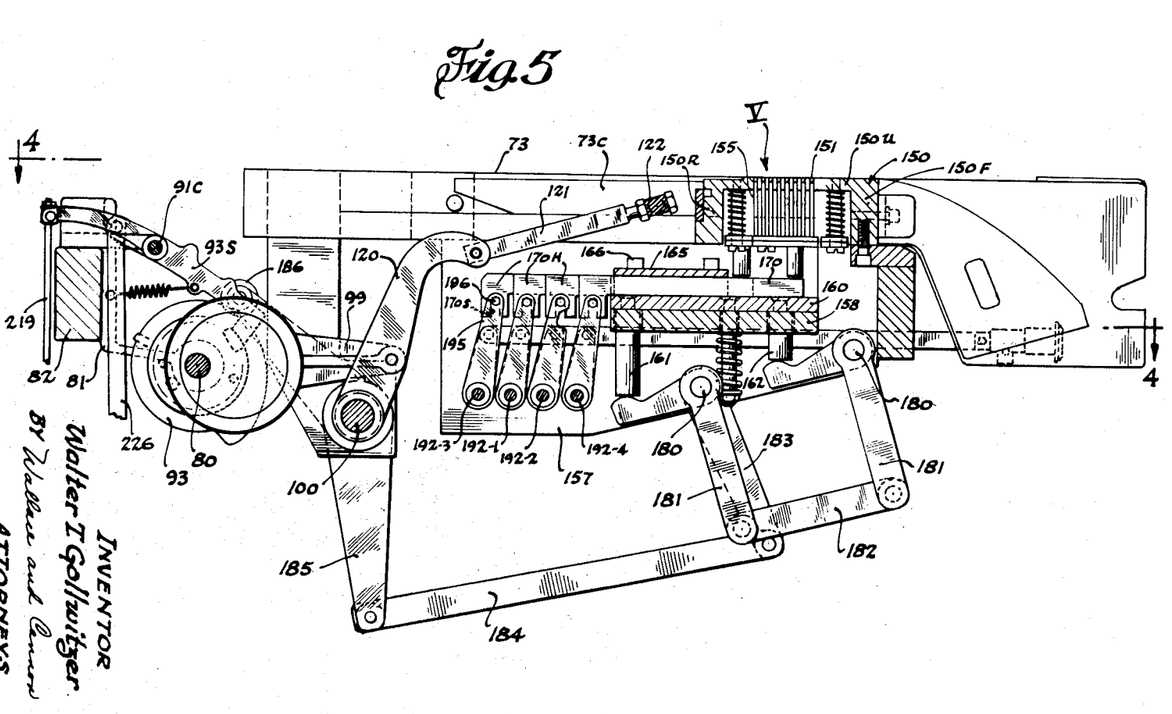
Fig. 5 is a fragmentary sectional view taken substantially along the line 5—5 of Fig. 4.
Figure 6:
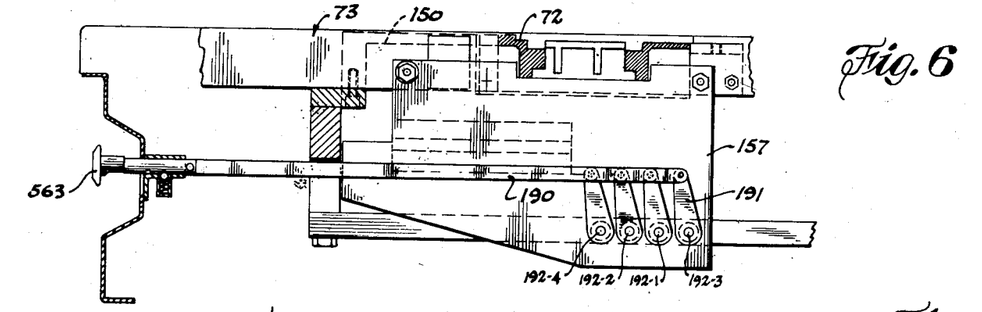
Fig. 6 is a vertical sectional view taken substantially along the line 6—6 of Fig. 4.

In affording the ejecting mechanism at station V, a mounting casting 150 is secured between the two side rails of the printing device guideway 73 as shown in Figs. 4 to 7 and this casting 150 is in effect hollow in form in that it has an upper wall 150U that has its upper surface disposed in the same relation as the anvil in the aforesaid Hueber patents. Along its forward edge the upper wall 150U has a downwardly projecting and relatively heavy flange 150F, while at its rear edge a relatively heavy downwardly projecting flange 150R is provided, as shown in Fig. 5 of the drawings.

Figure 7:
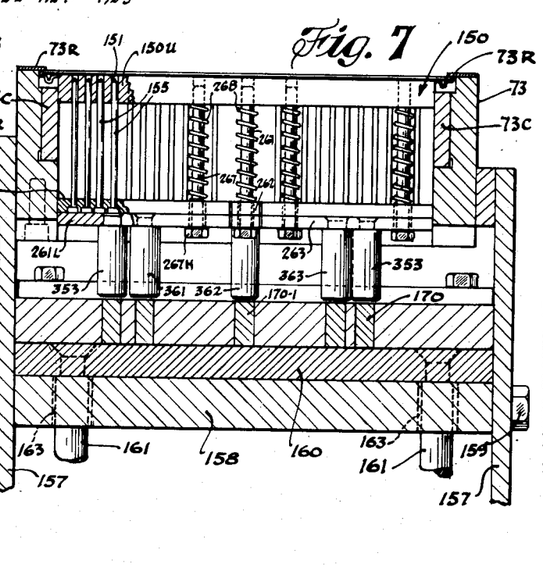
Fig. 7 is a vertical sectional view taken substantially along the line 7—7 of Fig. 8.
Figure 8:
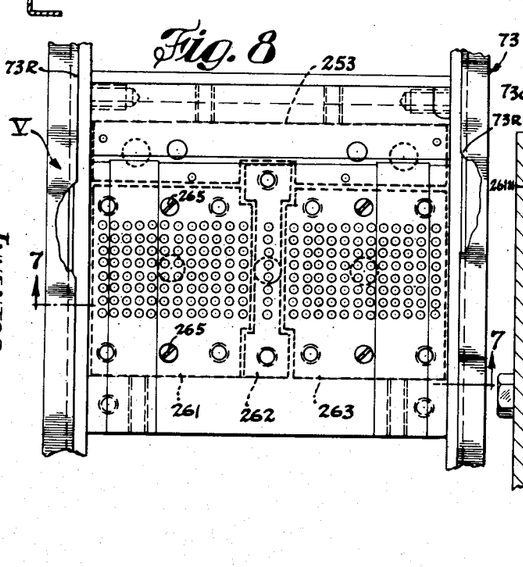
Fig. 8 is a plan view of the mechanism at the card removing station of the machine.

The upper wall 150U of the casting 150 is provided with a plurality of relatively small vertical bores 151 that correspond in location or position with the openings 60' and 60A that are afforded in the printing device frame 50, and when a printing device D is in station V, the openings 60' and 60A are accurately located over the corresponding bores 151 by the action of a positioning pawl 73P which engages a positioning notch 50N in the end of printing device frame in the manner described in the aforesaid Hueber patents. These openings 151 serve as guides for the upper ends of a plurality of ejecting pins 155 that are normally located with their upper ends beneath the upper surface of the wall 150U, but which are adapted to be moved upwardly in groups that correspond with the various cards that are mounted on the printing device frames 50. Thus, in affording means for actuating the pins 155 in such related groups, the pins are mounted on a plurality of plate assemblies that correspond generally in form with the form of the several cards that are to be ejected. Thus the pins 155 that are located beneath and are to be effective in ejecting the card 53 are mounted on a carrier plate assembly 253; the pins that are to be effective in ejecting the card 61 are mounted on a carrier assembly 261; the pins that are to be effective to eject the cards 61 are mounted on a carrier plate assembly 262; while the pins that are to be effective to eject cards 63 are mounted on a carrier plate assembly 263, as shown in Fig. 8 of the drawings. The aforesaid carrier plate assemblies are all formed in the same general manner shown in Fig. 7 of the drawings in that a lower plate 261L is provided against which the headed lower ends of the several pins 155 bear, and a retaining plate 261U is positioned on the top of the plate 261L in surrounding relationship to the lower headed portions of the pins 155. Screws 265 hold the retaining plate 261U in place on the lower plate 261L.

The several carrier plate assemblies 253, 261, 262 and 263 are mounted for limited vertical movement on downwardly projecting headed studs 267 that are threaded at their upper ends into the lower face of the wall 150U, and the heads 267H of these studs are located beneath the lower faces of the plate assemblies so as to limit downward movement of these plate assemblies. Springs 268 surrounding the several studs 267 act to yieldingly urge the related plate assemblies to their downward or lower positions as determined by the heads 267H.

The several plate assemblies 253, 261, 262 and 263 may be individually actuated in an upward direction so that any selected one of the cards may be ejected from a printing device D. To enable this to be done, a common actuator is afforded beneath the casting 150 and means are provided for rendering this common actuator effective selectively on the respective plate assemblies. In affording this actuator, a pair of spaced vertical mounting plates 157 are suspended from the rails of the guideway 73, and in a substantial downwardly spaced relationship with respect to the casting 150, a stationary base plate 158 is mounted in a horizontal position so as to extend between the two plates 157, this plate 158 being secured in position by cap screws 159. At the top of the base plate 158, a ram plate 160 is mounted for vertical movement toward and away from the base plate 158, and the ram plate 160 is actuated in such movement by operating and guiding pins 161 and 162 that extend slidably through vertical bores 163 that are formed in the base plate 158. At their upper ends, the pins 161 have reduced portions that are extended through the ram plate 160 and are riveted at their upper ends so as to be flush with the upper face of the ram plate 160. Only the rear portion of the plates 158 and 160 are located beneath the casting 150, as will be evident in Fig. 5 of the drawings, and over the forward portion of the ram plate 160, a guide plate 165 is provided. This guide plate 165 is held in position by screws 166 and it has parallel downwardly opening slots formed therein to receive and guide a plurality of horizontal interposers 170. The screws 166 hold the block 165 in a stationary relationship on the ram plate 166, and the interposers 170 are movable in a front to rear direction through the guide block 165 and along the top of the ram plate 160, and such movements are utilized for selectively interconnecting the ram plate 160 with the several mounting plate assemblies 253, 261, 262 and 263. Thus, as will be evident in Fig. 4, one interposer 170-1 is located substantially midway between the two plates 157, and this interposer 170-1, when it is moved to its most forward position, is located beneath a transmitting pin 362 that is centrally connected to the plate 262 so as to extend downwardly therefrom to substantially the level of the upper surface of the interposer 170-1. Similarly, the plate 261 has a downwardly extending, centrally located transmitting pin 361 that is arranged to be actuated by an interposer 170-2; the plate 263 has a downwardly-extending pin 363 that is adapted to be actuated by an interposer 170-3; while the plate 253 has a pair of downwardly projecting transmitting pins 353 located near opposite ends thereof as shown in Fig. 7 of the drawings and adapted to be actuated by a pair of interposers 170-4.

The interposers 170 may be selectively shifted between their effective and ineffective positions by means that will be hereinafter described, and by such setting of the interposers the ejecting action of the mechanism may be controlled. The ejecting mechanism is operated by a pair of rock shafts 180 that extend between the two mounting plates 151 as shown in Figs. 4 and 5. These rock shafts 180 are interconnected by lever arms 181 that are connected to the respective shafts 180 and which are interconnected by a transmitting link 182. The rear one of the shafts 180 has rocking movement imparted thereto by means including a downwardly projecting operating arm 183 which has a link 184 extended rearwardly from its lower end. This link 184 is connected to the lower end of one arm of a bell crank 185 that is loosely mounted on the shaft 100, and the other arm of the bell crank 185 has a cam roller 186 fixed thereon. This cam roller 186 bears against a cam 187 that is fixed, driven member of the clutch 93 so that in each rotation of the driven member of the clutch 93, the ram plate 160 of the ejector mechanism is operated through a vertical reciprocating cycle. Thus it will be evident that so long as the clutch 93 remains engaged, the ejecting mechanism will operate in each cycle. Thus it will be evident that so long as the clutch 93 remains engaged, the ejecting mechanism will operate in each cycle of machine operation, but that when the stop lever 93S is moved to its effective position, the clutch 93 will be disengaged so as to maintain the ejector mechanism inoperative in the next cycle of machine operation. This aspect of the invention will be discussed hereinafter.

Figure 1:
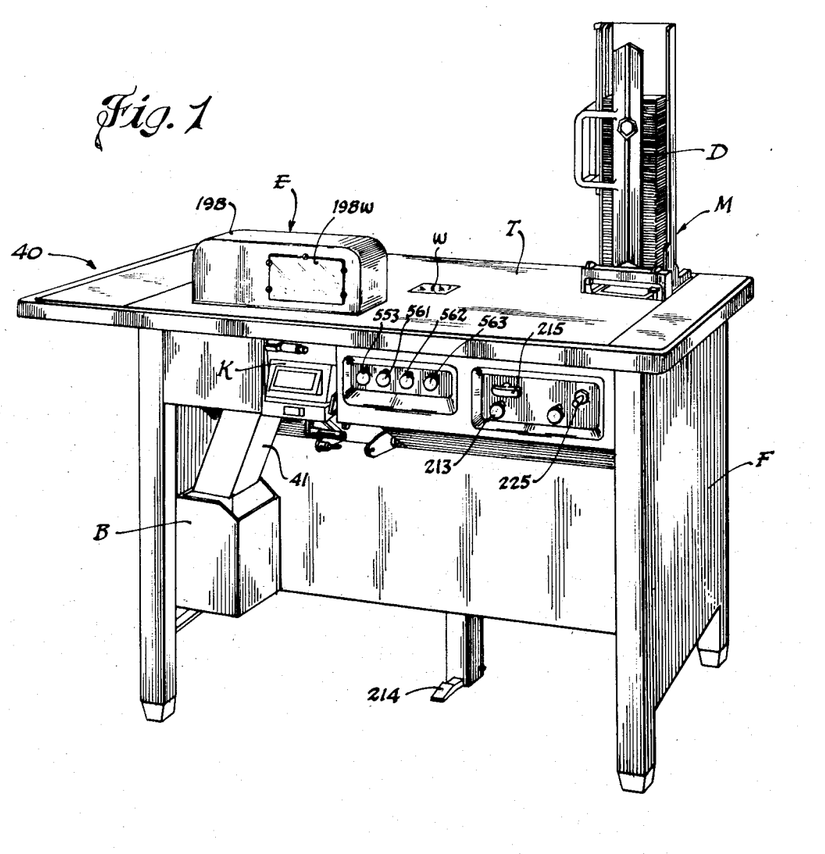
Figure 1 is a perspective view of a card removing machine embodying the features of the invention.

The interposers 170 are adapted to be readily shifted between their operative and inoperative positions by means of a plurality of control knobs 553, 561, 562 and 563 that are located in the front panel of the machine frame as will be evident in Fig. 1 of the drawings. These control knobs have connecting links 190 extended rearwardly therefrom and these connecting links 190 are pivotally connected with the upper ends of a plurality of arms 191, such arms 191 being fixed respectively on a plurality of rock shafts 192. These rock shafts are rotatably mounted in the two plates 151 and extend beyond these plates 151 and to the right as shown in Fig. 4. It is at the right hands of these rock shafts as shown in Fig. 4 that the arms 191 are mounted.

The various shafts 192 are connected to certain ones of the interposers 170 as will be evident in Fig. 4 of the drawings. Thus the several shafts 192 are specifically identified in Fig. 4 through the use of suffixes that correspond with the suffixes used in identifying the respective interposers, and these shafts have upwardly extending arms 195 fixed thereon, each arm having a laterally extending pin 196 adjacent its upper end. As will be evident in Fig. 5 of the drawings each of the interposers 170 has a downwardly extending head 170H at its rear end and each such head 170H has a downwardly opening slot 170S formed therein that is arranged to embrace the pin 196 of the related one of the levers 195. Thus the interposer 170-1 is operatively associated with the shaft 192-1; the interposer 170-2 is operatively associated with the shaft 192-2; the interposer 170-3 is operatively associated with the shaft 192-3; while the interposers 170-4 are relatively associated with the shaft 192-4. With the structure that has thus been described, the groups of ejecting pins may be rendered operable as desired, and any one or more of these groups of pins may be rendered effective in a simple manner.

*The card disposal means*

Figures 15, 17:
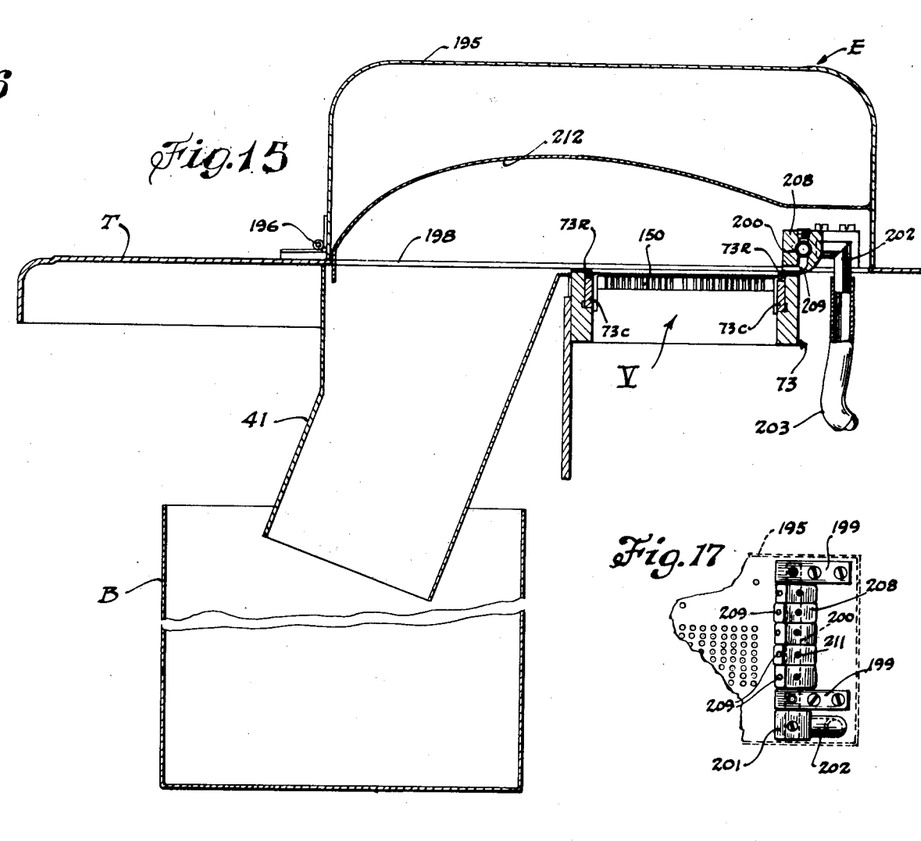
Fig. 15 is a vertical sectional view taken through the card removing station of the machine.
Fig. 17 is a fragmentary plan view showing the adjustable nozzle elements of the pressure air blast means at the card removing station.
Figure 16:
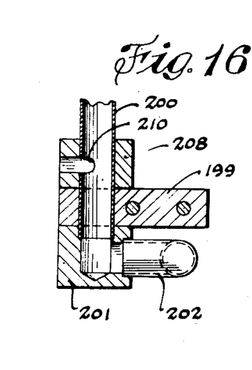
Fig. 16 is an enlarged view showing the connections for supplying the pressure air blast at the card removing station.

As hereinbefore pointed out, the card ejecting station E is located at station V of the machine, and the card ejecting station is in part defined by an upstanding hood 195 that extends over station V and to the left thereof for a substantial distance beyond the left-hand edge of the guideway 73, and at its left-hand end edge, the hood 195 is pivotally supported by a hinge 196. The disposal chute 41 is extended upwardly so that it registers with an opening 198 that is formed in the table top T as shown in Fig. 15 of the drawings, and the operation of the machine is such that when a card has been moved upwardly so as to be released from the retaining elements such as retaining elements 53 of the printing device frame, the released card is blown to the left and down through the opening 198 and downwardly through the disposal chute 41. The air blast that is required for such disposal of the removed cards is afforded by means located along the right-end edge of station V and within the hood 195 as will be evident in Figs. 15 to 17 of the drawings.

Thus along the right-hand edge of station V, a pair of stationary brackets 199 are secured in position on the table top T and these brackets 199 serve to support the air distribution tube or sleeve 200 that is closed at one end within one of the brackets 199 and which at its other end has an air inlet block 201 secured thereto. The air inlet block has a hose fitting 202 extended therefrom so that pressure air may be supplied to the sleeve 200 by means of a flexible connecting tube 203 that is extended from a pump 204. The pump 204 is in the present instance driven by a belt 205 from the main motor 84, but separate drive means might, of course, be provided if desired.

The pressure air that is thus supplied to the sleeve 200 is discharged through a plurality of nozzle fittings 208 that embrace the sleeve 200 and which have discharge orifices 209 formed therein so as to communicate with distributing openings 210 formed in the lower face of the sleeve 200. The fittings 208 are arranged to be adjustable about the axis of the sleeve 200, and may be held in adjusted position by set screws 211. Thus the discharge openings 209 of the several nozzle fittings 208 may be adjusted so as to apply the air blast most efficiently to the cards that have been removed from the printing devices D. These removed cards are blown slightly upwardly and to the left in Fig. 15 and may be guided by an overhanging arcuate guide element 212 within the hood 195 so as to assure that the cards will move downwardly into the disposal chute 41. In order that the operator may check on the proper operation of the disposal means within the hood 198, this hood may be provided with a transparent front window 198W as shown in Fig. 1 of the drawings, and this window is preferably located just forward of the discharge station V.

Normal operation and control

Figure 2:
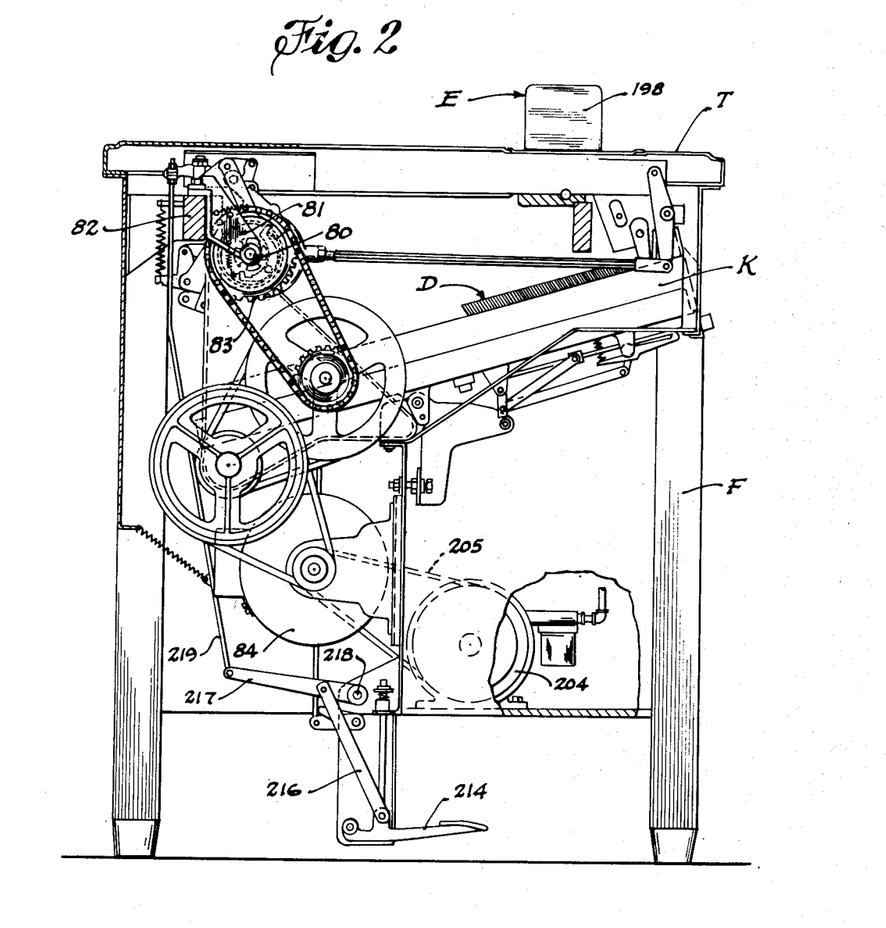
Figure 2 is a vertical sectional view taken through the machine of Fig. 1 adjacent to the left-hand end thereof and looking in a right-hand direction.
Figures 13, 14:
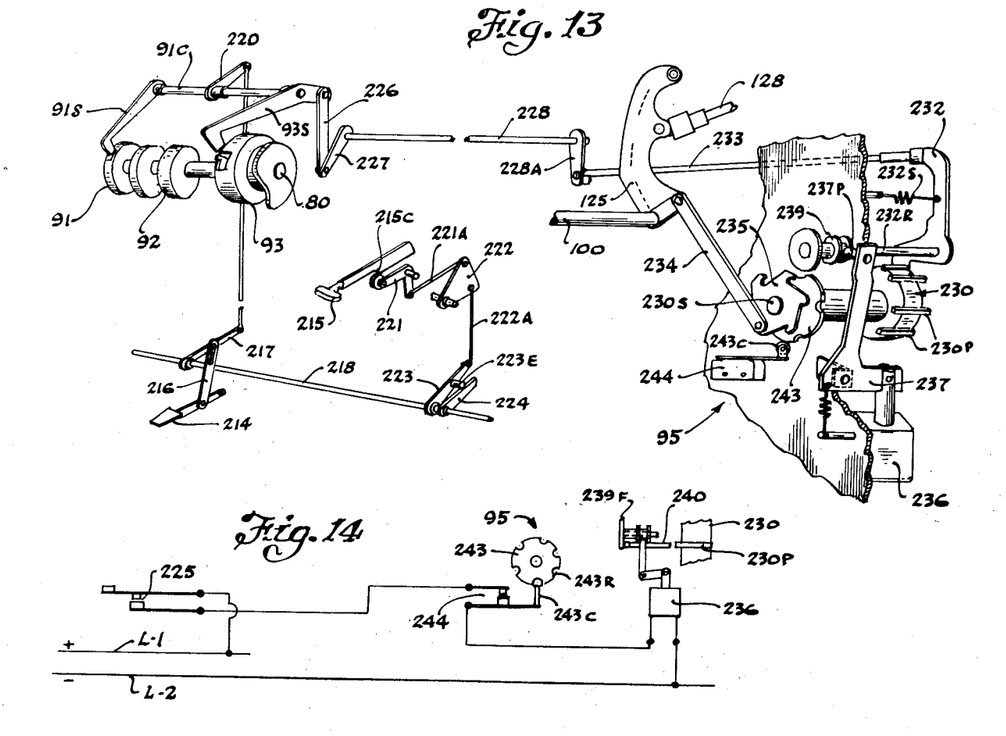
Fig. 13 is a schematic and partially perspective view illustrating the manner in which the manually controlled skipping mechanism is effective to suppress the operation of the card removing means.
Fig. 14 is a schematic wiring diagram.

The main drive motor is controlled by a main motor switch 213 that is located in a front panel of the machine, and where the pump 204 is driven by the same motor, the closure of the switch 213 serves to start the air blast means as well as the main drive shaft 80 of the machine. When the feeding of the printing devices D is to be started, this may be accomplished under control of a foot pedal 214 which is used for single cycle operations, or under control of a control lever 215 that is located adjacent the switch 213 and which is effective to maintain the clutch 91 in a continuously engaged condition. Thus the foot pedal 214 has a lost-motion connection including a link 216 to a rearwardly projecting arm 217 that is fixed on a horizontal rock shaft 218, as shown in Figs. 2 and 13. The rear end of the arm 217 is connected by a link 219 to the rear end of a rearwardly projecting control lever 220 that is fixed on the control shaft 91C so that when the foot pedal 214 is depressed, the control shaft 91C is rocked so as to shift the stop lever 91S to its ineffective position. The reciprocable control member 215 has a cam 215C which acts on a roller on one arm of a bell crank 221 so as to rock this bell crank when the plunger 215 is withdrawn. A link 221A connects the other arm of the bell crank 221 to a second bell crank 222. The other arm of the bell crank 222 has a vertical link 222A extended down to the rear end of an arm 223 that is loose on the shaft 218. An ear 223E on the arm 223 overlies an arm 224 fixed on the shaft. Thus, when the control member 215 is withdrawn, the stop lever 91S will be held in its ineffective position and the machine will operate continuously to feed printing devices D from the magazine M and into the card ejecting station E where one or more cards will be ejected in accordance with the setting of the several control knobs.

The manually controlled disabling means 95

As hereinbefore pointed out, it is desirable in some instances to prevent the ejection of cards from certain of the printing devices, and by visual inspection of the successive printing devices as they appear beneath the window W, the operator may determine when the card ejecting means is to be suppressed. Upon making such determination, the operation actuates a normally open toggle switch 225 that is located on a front panel of the machine adjacent to the switch 213, and operation of the switch 225 renders automatic means effective to disengage the clutch 93 in that cycle of operation when the particular printing device is located at the air ejecting station E. In accomplishing this, storage means are rendered effective under control of the switch 225, and such storage means are in the present instance afforded by utilizing a portion of the selector and storage means that are disclosed in detail in the aforesaid Heuber Patent No. 2,359,851.

Thus as disclosed in the aforesaid Hueber patent, the rearwardly projecting end of the stop lever 93S has a downwardly extending link 226 secured thereto and this link is connected to the forwardly projecting end of an arm 227 that is fixed on a control rock shaft 228. This control rock shaft 228 extends to the right along a rear portion of the machine and is supported in downward extensions of the brackets 81, and at its right-hand end, the shaft 228 has a downwardly and forwardly projecting arm 228A whereby the shaft 228 may be rocked in a clockwise direction when the clutch 93 is to be disengaged. Such clockwise rocking movement of the shaft 228 is effective to shift the stop lever 93S to its effective position. The control of the rock shaft 228 is effected by means including a storage drum 230 that has a plurality of longitudinally settable plungers 230P mounted thereon at circumferentially spaced points so as to be parallel to the rotative axis that is afforded by a shaft 230S upon which the drum 230 is fixed. This drum is in its major respects like the drum shown in the aforesaid Hueber Patent No. 2,359,851, and reference may be had to such patent for a detailed disclosure of the construction and operation of the drum. It may be pointed out, however, that this drum 230 is actuated in a step-by-step manner in a clockwise direction as viewed in Fig. 9 and such actuation or indexing takes place in the first half of each machine cycle. The plungers 230P are utilized, when these plungers are in what may be termed their set positions, to impart the control rocking movement to the shaft 228, and for this purpose a rocker 232 is mounted above the drum 230 on a rocking axis 232R. The upper end of the rocker 232 is connected by a link 233 to the arm 228A and a spring 232S actuating on the rocker 232 serves to urge the rocker 232 in a clockwise direction so as to tend normally to hold the stop lever 93S in its ineffective position. The rocker 232 has a rearwardly projecting arm 232A formed thereon and extending rearwardly to such a position that a plunger 230P that has been moved to its set position will engage the arm 230A when this plunger comes to rest just to the right of the vertical plane that passes through the axis of the drum. When this takes place the control shaft 228 will be rocked so as to shift the stop lever 93S to its effective position.

The drum 230 is operated in each cycle of the machine by means including an operating pawl 234 that is pivoted on the arm 125 and which extends downwardly and forwardly so that an operating pin 234P at the end of the pawl 234 may engage the teeth of a ratchet wheel 235 that is fixed on the shaft 230S. Thus when the rock shaft 100 rocks in a counterclockwise direction in the first half of each machine cycle, the pawl 234 will be effective to advance the drum 230, and it might be pointed out that after a set plunger 230P has accomplished its function, it is automatically returned to a restored position by cam means of the character shown in the aforesaid Hueber patents.

Figures 9, 10, 11, 12:
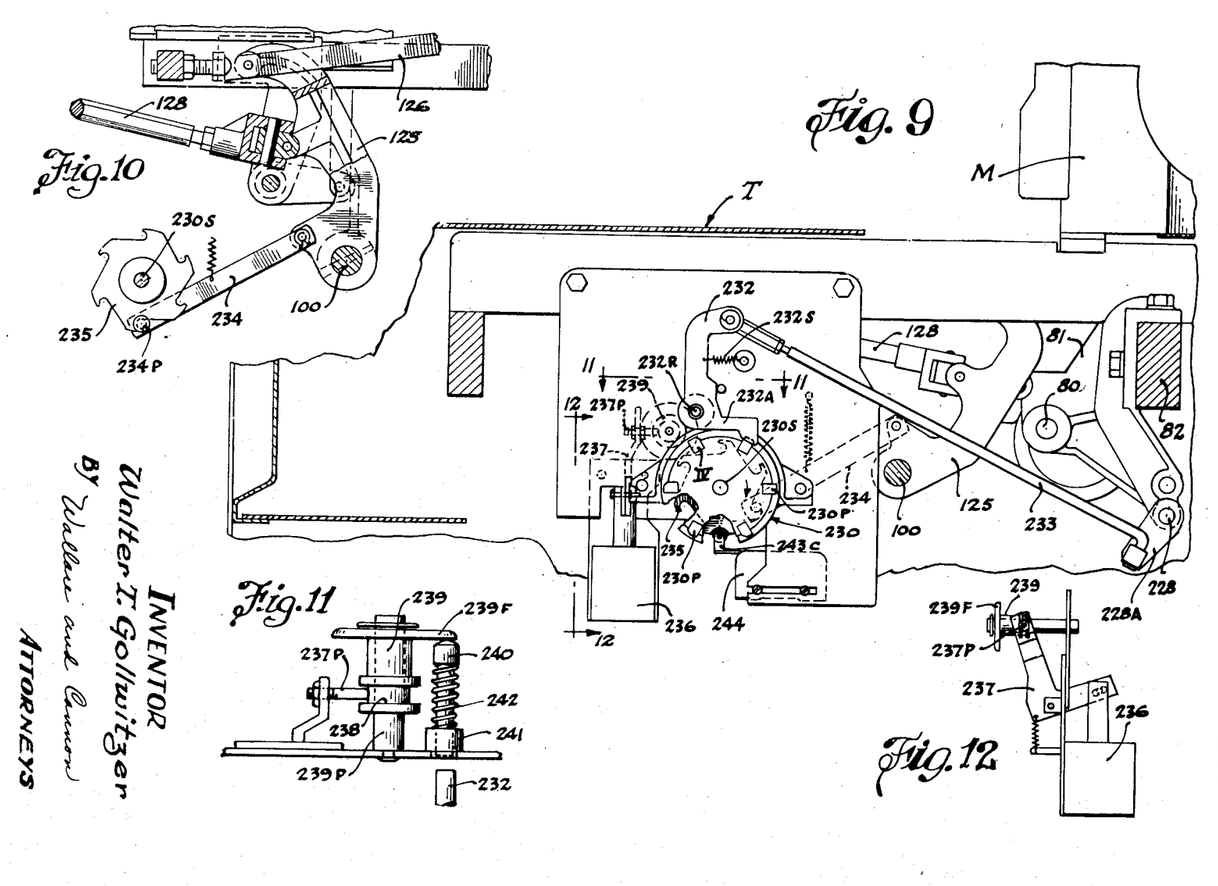
Fig. 9 is a fragmental vertical sectional view taken at the right-hand end of the machine and looking toward the left and showing the details of the manually controlled skipping mechanism of the machine.
Fig. 10 is a fragmental view showing the manner in which the mechanism of Fig. 9 is operated in timed relationship to the other elements of the machine.
Fig. 11 is a plan sectional view taken substantially along the line 11—11 of Fig. 9.
Fig. 12 is an elevational view taken substantially along the line 12—12 of Fig. 9.

The plungers 230P may be set when such plungers are in the position identified as position IV in Fig. 9 of the drawings and this setting is accomplished by means including a solenoid 236. The solenoid 236 has the armature thereof connected to the horizontal arm of a bell crank 237, the vertical arm of which has a laterally projecting pin 237P secured thereto. This pin 237P being extended into a groove 238 formed in an axially shiftable mounted sleeve 239. The sleeve 239 is mounted on a pin 239P and it has a relatively large flange 239F thereon. This flange is arranged to extend to a point opposite one end of a shiftable pin 240 which is mounted in a guide bearing 241 and which is normally urged in a retracting direction by a surrounding spring 242. When the solenoid 236 is energized, the sleeve 239 is shifted in an endwise direction so as to impart corresponding shifting movement to the plunger 230P, and this plunger 230P is aligned with position IV of the drum. Thus the aligned plunger 230P that is in position IV will be actuated in an endwise direction to its set position.

The arrangement is such that solenoid 236 may be energized only when the drum 230 is in its rest position, and for this purpose a control disk 243 is fixed on the shaft 230S. This control disk 243 has a plurality of circumferentially spaced recesses 243R therein, and a cam follower 243C is arranged to enter one of these recesses 243 whenever the drum 230 is in a rest position. The follower 243C is arranged to control a switch 244 so as to open the switch 244 during the period when the drum 230 is being moved btween its rest positions. The switch 244 is in series with the manual control switch 225 from one line wire L-1 to one terminal of the solenoid 236, while the line wire L-2 is connected to the other terminal of the solenoid 236. With the arrangement thus afforded, it will be clear that the switch 244 will be closed during the last half of the machine cycle in which a particular printing device D is moved into the visual inspection station IV, and at this time the operator may close the switch 225 so as to cause the storage pin 230P that is in station IV, Fig. 9, to be actuated. Thus in the next machine cycle when the particular printing device is moved into station IV-T, the set plunger 230P will move into the next station on the drum 230, and in so doing, such set plunger 230P will rock the rocker 232 and thus cause the stop lever 93S to be moved to its effective position. This will result in the clutch 93 being disengaged at the end of this particular machine cycle. Hence, when the next machine cycle is initiated, the clutch 93 will remain inactive or disengaged, and the particular printing device which in this machine cycle will be moved into the ejecting station, will not be subjected to a card ejecting operation. During such cycle, however, the drum 230 will be moved an additional step, and unless another set plunger 230P is encountered in the succeeding position on the drum, the stop lever 93S will be returned to its ineffective position so that normal card ejecting operations will be resumed.

*Conclusion*

From the foregoing description it will be apparent that the present invention enables the index or control cards of printing and control devices to be removed in a simple and expeditious manner, and it will also be apparent that the card removing operation is performed mechanically by means that may be set so as to remove any selected card from such a printing and control device.

It will also be evident that the present card removing machine is of such a character that the card removing operations may be readily and easily suppressed, and that this may be accomplished by an operator who visually inspects the printing and control devices as they are being passed through the machine.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a card ejecting machine through which printing and control devices, each bearing a plurality of cards held in place by retaining means in different card-mounting positions thereon, are adapted to be passed one by one, a supply magazine into which printing and control devices may be introduced, means defining an ejecting station at which such devices may be positioned, means for advancing such printing and control devices one by one and in a step-by-step manner from said magazine and into said ejecting station, and means at said ejecting station operable selectively to eject a card from any one or more of said card mounting positions of a printing and control device while such printing and control device is at rest at such ejecting station.

2. In a card ejecting machine through which printing and control devices, each bearing a plurality of cards held in place by retaining means in different card-mounting positions thereon, are adapted to be passed one by one, a supply magazine into which printing and control devices may be introduced, means defining an ejecting station at which such devices may be positioned, means for advancing such printing and control devices one by one and in a step-by-step manner from said magazine and into said ejecting station, a plurality of card ejecting units allocated to the respective card-mounting positions and mounted at said card ejecting station for independent card-ejecting movement, a common actuator for said units, and control means for selectively rendering said common actuator effective to actuate one or more of said card ejecting units.

3. In a card ejecting machine through which printing and control devices, each bearing a plurality of cards held in place in different card-mounting positions thereon by retaining means, are adapted to be passed one by one, a supply magazine into which printing and control devices may be introduced, means defining an ejecting station at which such devices may be positioned, means for advancing such printing and control devices one by one and in a step-by-step manner from said magazine and into said ejecting station, a plurality of card ejecting units allocated to the respective card-mounting positions and mounted at said card ejecting station for independent card-ejecting movement, and means for selectively actuating one or more of said card ejecting units.

4. In a card ejecting machine through which printing and control devices, each bearing a plurality of cards held in place in different card-mounting positions thereon by retaining means, are adapted to be passed one by one, a supply magazine into which printing and control devices may be introduced, means defining an ejecting station at which such devices may be positioned, means for advancing such printing and control devices one by one and in a step-by-step manner from said magazine into said ejecting station, a plurality of card ejecting units allocated to the respective card-mounting positions and mounted at said card ejecting station for independent card-ejecting movement, means for selectively actuating one or more of said card ejecting units, and card disposal means operable to remove the ejected cards from said ejecting station.

5. In a card ejecting machine through which printing and control devices, each bearing a plurality of cards held in place in different card-mounting positions thereon by retaining means, are adapted to be passed one by one, a supply magazine into which printing and control devices may be introduced, means defining an ejecting station at which such devices may be positioned, means for advancing such printing and control devices one by one and in a step-by-step manner from said magazine and into said ejecting station, a plurality of card ejecting units allocated to the respective card-mounting positions and mounted at said card ejecting station for independent card-ejecting movement, a common actuator for said units, control means for selectively rendering said common actuator effective to actuate one or more of said card ejecting units, and manually settable means for disabling said common actuator in a predetermined cycle of machine operation.

6. In a card ejecting machine through which printing and control devices, each bearing a plurality of cards held in place in different card-mounting positions thereon by retaining means, are adapted to be passed one by one, a supply magazine into which printing and control devices may be introduced, means defining an ejecting station at which such devices may be positioned, means for advancing such printing and control devices one by one and in a step-by-step manner from said magazine and into said ejecting station, a plurality of carrier plates allocated to the respective card-mounting areas and mounted for limited up and down movement at said ejecting station, a plurality of card engaging pins carried by each plate for engaging and ejecting a card when the related plate is moved upwardly, a common actuator means including a ram plate and a one-revolution clutch for moving said ram plate up and down in each cycle of machine operation, interposers selectively settable to render said ram plate effective on said plates, and settable means including a storage means for causing disengagement of said clutch in a predetermined cycle of machine operation.

7. In a card ejecting machine through which printing and control devices, each bearing a card held in place in a card-mounting position thereon by retaining means, are adapted to be passed one by one, a supply magazine into which printing and control devices may be introduced, means defining an ejecting station at which such devices may be positioned, means for advancing such printing and control devices one by one and in a step-by-step manner from said magazine along a predetermined path and through a succession of intermediate stations and into said ejecting station, means defining a visual inspection window at one of said intermediate stations, a card ejecting unit mounted at said card ejecting station for card-ejecting movement, an actuator for said unit, and control means for disabling said actuator settable when a particular printing device is moved into position under said visual inspection window and operable to disable said actuator in the cycle in which such particular printing device is located at said ejecting station.

8. In a card ejecting machine through which printing and control devices, each bearing a card held in place by retaining means in a card-mounting position thereon, are adapted to be passed one by one, a supply magazine into which printing and control devices may be introduced, means defining an ejecting station at which such devices may be positioned, means for advancing such printing and control devices one by one and in a step-by-step manner from said magazine along a predetermined path and through a succession of intermediate stations including a visual inspection station and into said ejecting station, a card ejecting unit mounted at said card ejecting station for card-ejecting movement, operation means for said unit, and control means for disabling said operation means settable when a particular printing device is moved into said visual inspection station and operable to disable said actuating means in the cycle in which such particular printing device is located at said ejecting station.

9. In a card ejecting machine through which printing and control devices, each bearing a card held in place in a card-mounting position thereon by retaining means, are adapted to be passed one by one, a supply magazine into which printing and control devices may be introduced, means defining an ejecting station at which such devices may be positioned, means for advancing such printing and control devices one by one and in a step-by-step manner from said magazine along a predetermined path and through a succession of intermediate stations and into said ejecting station, means defining a visual inspection window at one of said intermediate stations, a card ejecting unit mounted at said card ejecting station for card-ejecting movement, an actuator for said unit, and means for disabling said actuator including a storage means settable when a particular printing device is moved into position under said visual inspection window and a one-revolution clutch disengaged by said storage means to disable said actuator in the cycle in which such particular printing device is located at said ejecting station.

10. In a card ejecting machine through which printing and control devices, each bearing a card held in place in a card-mounting position thereon by retaining means, are adapted to be passed one by one, a supply magazine into which printing and control devices may be introduced, means defining an ejecting station at which such devices may be positioned, means for advancing such printing and control devices one by one and in a step-by-step manner from said magazine along a predetermined path and through a succession of intermediate stations including a visual inspection station and into said ejecting station, a card ejecting unit mounted at said card ejecting station for card-ejecting movement, a disposal passage at one side of said card ejecting station, air blast means at the opposite side of said ejecting station for blowing ejected cards out of said station and into said disposal passage, operating means for said unit, and means for disabling said operating means settable when a particular printing device is moved into said visual inspection station and operable to disable said operating means in the cycle in which such particular printing device is located at said ejecting station.

11. In a card ejecting machine through which printing and control devices each comprising a frame bearing a card held in position on said frame by retaining means of a fixed character overlying edge portions of such card and in which the frame has at least two openings through said frame beneath the card at spaced points, a supply magazine into which such printing and control devices may be introduced, means defining an ejecting station at which said devices may be positioned, means for advancing such printing and control devices one by one and in a step-by-step manner from said magazine into said ejecting station, a plurality of ejecting pins disposed at said ejecting station in positions disposed to register with the respective openings in the frame of such a printing and control device located at said ejecting station, means operable to impart upward ejecting movements to said pins in unison so that such pins move through said openings in the frame of such printing and control device and eject the card from said retaining means, means defining a disposal passage on one side of said ejecting station, and air blast means positioned on the opposite side of said station for blowing ejected cards towards disposal passage.

WALTER T. GOLLWITZER.

References Cited in the file of this patent

UNITED STATES PATENTS

| Number | Name | Date |
|---|---|---|
| 1,644,773 | Demming | Oct. 11, 1927 |
| 1,736,482 | Broadmeyer | Nov. 19, 1929 |
| 1,748,720 | Lafferty | Feb. 25, 1930 |
| 1,893,463 | McCain | Jan. 3, 1933 |
| 1,897,125 | Hult | Feb. 14, 1933 |
| 2,261,972 | Matthews | Nov. 11, 1941 |
| 2,332,863 | Leuhrs | Oct. 26, 1943 |
| 2,496,435 | Hueber | Oct. 10, 1944 |
| 2,496,435 | Boyle | Feb. 7, 1950 |